(12) United States Patent
Aripirala et al.

(10) Patent No.: US 12,530,977 B2
(45) Date of Patent: Jan. 20, 2026

(54) SYSTEMS AND METHODS FOR VECTORING AIRCRAFT IN RELATION TO AN AIR TRAFFIC SERVICE ROUTE

(71) Applicant: THE BOEING COMPANY, Arlington, VA (US)

(72) Inventors: Chaitanya Pavan Kumar Aripirala, Karnataka (IN); Ajaya Srikanta Bharadwaja, Karnataka (IN); Veeresh Kumar Masaru Narasimhulu, Karnataka (IN)

(73) Assignee: The Boeing Company, Arlington, VA (US)

( * ) Notice: Subject to any disclaimer, the term of this patent is extended or adjusted under 35 U.S.C. 154(b) by 325 days.

(21) Appl. No.: 18/298,522

(22) Filed: Apr. 11, 2023

(65) Prior Publication Data

US 2024/0346936 A1  Oct. 17, 2024

(51) Int. Cl.
  *G08G 5/30* (2025.01)
  *B64D 43/00* (2006.01)
  *G01C 21/20* (2006.01)
  *G08G 5/21* (2025.01)

(52) U.S. Cl.
  CPC ............... *G08G 5/30* (2025.01); *B64D 43/00* (2013.01); *G01C 21/20* (2013.01); *G08G 5/21* (2025.01)

(58) Field of Classification Search
  None
  See application file for complete search history.

(56) References Cited

U.S. PATENT DOCUMENTS

| | | | |
|---|---|---|---|
| 12,073,731 B1 * | 8/2024 | Suiter | B64D 45/08 |
| 2007/0078572 A1 * | 4/2007 | Deker | G08G 5/34 |
| | | | 701/3 |
| 2017/0352281 A1 * | 12/2017 | Donovan | G06F 9/44 |
| 2020/0402412 A1 * | 12/2020 | Shamasundar | G08G 5/34 |
| 2022/0189323 A1 * | 6/2022 | Chaubey | G01S 13/913 |

* cited by examiner

*Primary Examiner* — Madison R. Inserra
(74) *Attorney, Agent, or Firm* — Joseph M. Butscher; The Small Patent Law Group, LLC

(57) ABSTRACT

A system and a method include a control unit configured to receive a vectoring path for an aircraft. The vectoring path diverts from an air traffic service route for the aircraft. The control unit is further configured to automatically determine segments of the vectoring path, automatically monitor a position of the aircraft within an airspace, and automatically send vectoring instructions to the aircraft in response to the aircraft reaching locations within the airspace associated with one or more points of the segments.

20 Claims, 4 Drawing Sheets

SYSTEMS AND METHODS FOR VECTORING AIRCRAFT IN RELATION TO AN AIR TRAFFIC SERVICE ROUTE

FIELD OF THE DISCLOSURE

Examples of the present disclosure generally relate to systems and methods for re-routing aircraft in relation to an original flight route from a departure airport to an arrival airport, and more particularly to systems and methods for vectoring aircraft in relation to an air traffic service route.

BACKGROUND OF THE DISCLOSURE

Aircraft are used to transport passengers and cargo between various locations. Numerous aircraft depart from and arrive at a typical airport every day.

Controlling air traffic can be stressful and challenging. An air traffic controller typically monitors and provides directions for multiple flights at any one time. As long as aircraft fly according to planned air traffic service routes, workload for an air traffic controller is relatively low, as the aircraft on the different routes are separated by other aircraft and obstacles by design.

However, aircraft may need to be re-routed from an original route for various reasons, such as weather, restricted air space, and/or the like. When an air traffic controller vectors an aircraft off a designated route, workload and stress for the air traffic controller may increase. For example, in high density air traffic conditions, the air traffic controller may not be able to provide all instructions to all the aircraft at appropriate times.

SUMMARY OF THE DISCLOSURE

A need exists for a system and a method for efficiently and effectively vectoring aircraft according to a re-routed flight path. A need exists for a system and a method for reducing workload and stress for an air traffic controller.

With those needs in mind, certain examples of the present disclosure provide a system including a control unit configured to receive a vectoring path for an aircraft. The vectoring path diverts from an air traffic service route for the aircraft. The control unit is further configured to automatically determine segments of the vectoring path, automatically monitor a position of the aircraft within an airspace, and automatically send vectoring instructions to the aircraft in response to the aircraft reaching locations within the airspace associated with one or more points of the segments.

In at least one example, the system also includes a user interface in communication with the control unit. The user interface includes a display and an input device. The vectoring path is provided by the input device in relation to the display.

In at least one example, the segments include a first segment and a second segment that is adjacent to the first segment. A first heading for the first segment differs from a second heading for the second segment.

In at least one example, the control unit is further configured to output vectoring instruction signals including the vectoring instructions to the aircraft. The vectoring instruction signals can include text or graphical data configured to be shown on a display of a flight computer. The vectoring instruction signals can include audio signals configured to be broadcast from a speaker within a flight deck or cockpit of the aircraft.

In at least one example, the control unit is further configured to output an alert in response to one or more of the vectoring instructions not providing a predetermined separation distance between the aircraft and at least one other aircraft.

In at least one example, the aircraft is configured to be automatically operated according to the vectoring instructions.

In at least one example, at least a portion of the vectoring path includes an approach path to a runway.

In at least one example, the control unit is an artificial intelligence or machine learning system.

Certain examples of the present disclosure provide a method including receiving, by a control unit, a vectoring path for an aircraft, wherein the vectoring path diverts from an air traffic service route for the aircraft; automatically determining, by the control unit, segments of the vectoring path; automatically monitoring, by the control unit, a position of the aircraft within an airspace; and automatically sending, by the control unit, vectoring instructions to the aircraft in response to the aircraft reaching locations within the airspace associated with one or more points of the segments.

Certain examples of the present disclosure provide a non-transitory computer-readable storage medium comprising executable instructions that, in response to execution, cause one or more control units comprising a processor, to perform operations comprising receiving a vectoring path for an aircraft, wherein the vectoring path diverts from an air traffic service route for the aircraft; automatically determining segments of the vectoring path; automatically monitoring a position of the aircraft within an airspace; and automatically sending vectoring instructions to the aircraft in response to the aircraft reaching locations within the airspace associated with one or more points of the segments.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps.

Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for aiding an air traffic controller. The systems and methods enable the air traffic controller to provide (such as by drawing) a vectoring path from a current position of the aircraft to an intended position. A control unit receives the vectoring path and determines a series of vectoring instructions for the vectoring path. The control unit is in communication with the aircraft and outputs the vectoring instructions to the pilot at appropriate times considering the performance of the aircraft. In at least one example, the control unit also provides the air traffic controller an option to provide climb and descend instructions as well.

In at least one example, if a vectoring instruction does not provide a predetermined separation distance (for example, a minimum separation distance as determined by an aircraft operator, and/or an air traffic controller) between a pair of aircraft, the control unit can output an alert regarding the separation distance. In at least one example, the control unit may prevent such vectoring instruction and may prompt the air traffic controller to provide a revised vectoring path. In at least one other example, the control unit may automatically revise the vectoring path to ensure that the predetermined separation distance is maintained.

The systems and methods described herein address high controller workload situations when an aircraft is taken off of a designated air traffic service route, especially in high traffic environments.

Figure 1:
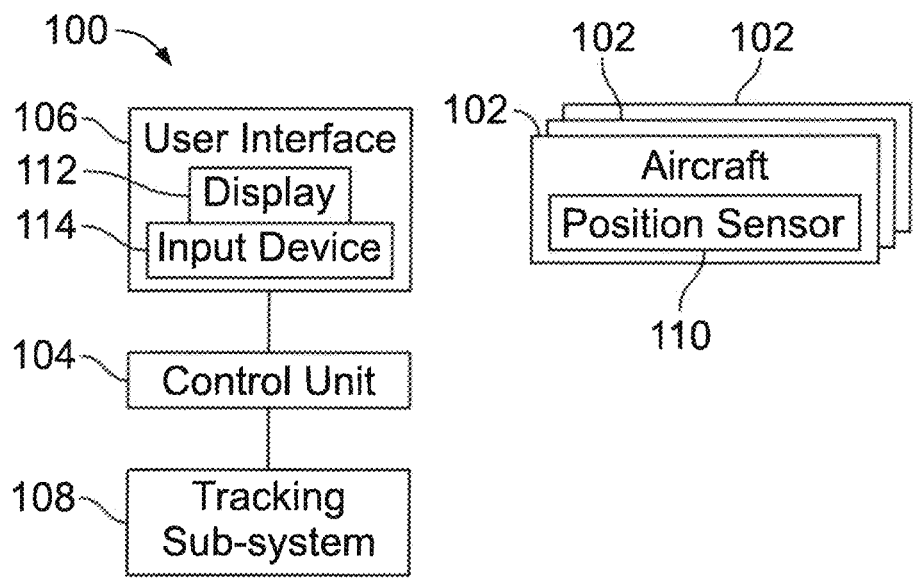
FIG. 1 illustrates a schematic block diagram of a system for vectoring aircraft in relation to an air traffic service route, according to an example of the present disclosure.

FIG. 1 illustrates a schematic block diagram of a system 100 for vectoring aircraft 102 in relation to an air traffic service route, according to an example of the present disclosure. The air traffic service route is an originally-planned flight path for an aircraft 102 from a destination airport to an arrival airport. The aircraft 102 may need to be re-routed in relation to the air traffic service route for a variety of reasons, such as inclement weather, restricted airspace, air traffic congestion, and/or the like.

The system 100 includes a control unit 104 in communication with a user interface 106 through one or more wired or wireless connections. The control unit 104 and the user interface 106 can be co-located, such as at a central monitoring location, an air traffic control tower at an airport, or the like. In at least one example, the user interface 106 includes the control unit 104. As another example, the user interface 106 is separate and distinct from the control unit 104.

The control unit 104 is also in communication with the aircraft 102, such as through communication devices, such as antenna, transceivers, transponders, and/or the like. The control unit 104 is configured to output vectoring instructions, via wireless signals, to the aircraft 102. For example, the vectoring instructions are output to the aircraft 102 by the control unit 104 and shown on a flight computer, broadcast from a speaker, or the like within a flight deck or cockpit of the aircraft 102.

The control unit 104 is also in communication with a tracking sub-system 108, such as through one or more wired or wireless connections. The tracking sub-system 108 can be co-located with the control unit 104. As another example, the tracking sub-system 108 can be remotely located from the control unit 104. The tracking sub-system 108 is configured to track positions of the aircraft 102 in real time. In at least one example, the tracking sub-system 108 is a radar sub-system. As another example, the tracking sub-system is an automatic dependent surveillance-broadcast (ADS-B) tracking sub-system. Real time positions of the aircraft 102 on the ground and within an airspace are detected by the tracking sub-system 108 that receives position signals output by position sensors 110 of the various aircraft 102. For example, the tracking sub-system 108 receives ADS-B signals output by the positions sensors 110 of the various aircraft 102. As another example, the position sensors 110 can be global positioning system sensors. The position sensors 110 output signals signal indicative of one or more of the position, altitude, heading, acceleration, velocity, and/or the like of the various aircraft 102. The signals are received by the tracking sub-system 108.

The tracking sub-system 108 is configured to track a current position of the aircraft 102. The control unit 104 monitors the position of the aircraft 102 through data received from the tracking sub-system 108. That is, the tracking sub-system 108 tracks the position of the aircraft 102, and the control unit 104 receives such data from the tracking sub-system 108. In at least one example, the tracking sub-system 108 is an ADS-B tracking sub-system. In such an example, the ADS-B tracking sub-system 108 determines a current position of an aircraft 102 via satellite navigation through a positional signal of the aircraft 102 output by the position sensor 110, which is received by one or more position receivers of the tracking sub-system 108. The position sensor 110 can be or include a transmitter that periodically outputs information about the aircraft 102, such as identification details, current position, current altitude, and current velocity. The tracking sub-system 108 receives the transmitted position signal from the position receivers to determine a current and real time position, heading, velocity, and the like of the aircraft 102. Alternatively, the tracking sub-system 108 can be a radar system, GPS system, and/or other such system that is configured to track the position of the aircraft 102.

The user interface 106 includes a display 112 and an input device 114, both of which can be in communication with the control unit 104. The display 112 can be a monitor, screen, television, touchscreen, and/or the like. The input device 114 can include a keyboard, mouse, stylus, touchscreen interface (that is, the input device 114 can be integral with the display 112), and/or the like. The user interface 106 can be, or part of, a computer workstation. As another example, the user interface 106 can be a handheld device, such as a smart phone, tablet, or the like.

The user interface 106 is configured to be operated by an air traffic controller to monitor one or more routes of the aircraft 102. The air traffic controller is able to operate the user interface 106 to provide a vectoring path for the aircraft 102. The vectoring path deviates from the air traffic service route to avoid an obstacle within the air traffic service route. Examples of the obstacle include inclement weather, restricted airspace, undesirable air traffic congestion, and/or the like.

Figure 2:
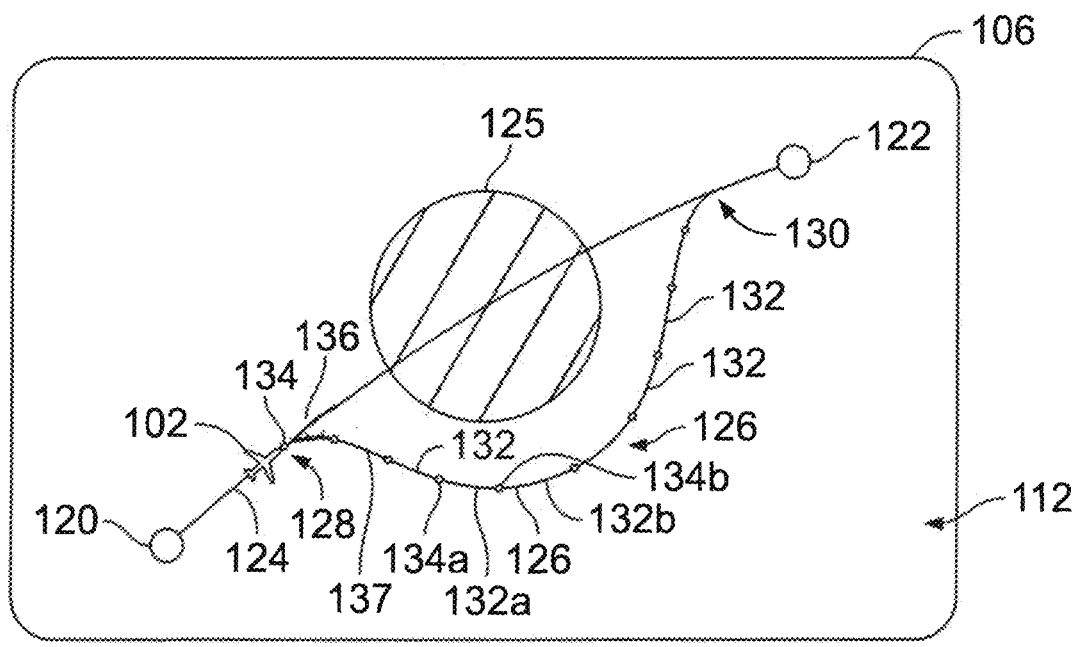
FIG. 2 illustrates a simplified front view of a display of a user interface, according to an example of the present disclosure.

FIG. 2 illustrates a simplified front view of the display 112 of the user interface 106, according to an example of the present disclosure. Referring to FIGS. 1 and 2, an aircraft 102 is scheduled to fly from a departure airport 120 to an arrival airport 122 according to originally planned air traffic service route 124. However, an obstacle 125 can be disposed within at least a portion of the air traffic service route 124. As noted, the obstacle 125 can be inclement weather, restricted airspace, undesirable (such as excessive) air traffic congestion, and/or the like. Therefore, an air traffic controller vectors an aircraft 102 shown on the display 112 off the air traffic service route 124 to avoid the obstacle 125. For example, the air traffic controller operates the user interface 106 to provide a vectoring path 126 from a current position 128 of the aircraft 102 to an intended position 130, such as can link back to the original air traffic service route 124. In at least one example, the input device 114 can be used to provide the vectoring path 126, such as by the air traffic controller drawing the vectoring path 126 with the input device 114 (such as a stylus, or a touch screen interface).

The control unit 104 receives data indicative of the vectoring path 126. The control unit 104 then determines a plurality of segments 132 of the vectoring path 126. The control unit 104 separates the vectoring path 126 into the plurality of segments 132. For example, the control unit 104 can separate the vectoring path into three, four, five, six, or more segments 132.

At a start point 134 of each segment 132, the control unit 104 determines a heading for the aircraft 102 to fly for a particular distance 136 until the aircraft 102 reaches the start point 134 for the next segment 132. The control unit 104 determines the headings and distances for each segment of the vectoring path 126. For example, the control unit 104 automatically (without human intervention) determines a heading for the aircraft 102 at start point 134a of the segment 132a. The aircraft 102 is to fly the particular distance of the segment 132a (such as a determined number of miles) at the heading. The control unit 104 automatically determines a heading for the aircraft 102 at start point 134b of the segment 132b in a similar manner. The start point 134b of the segment 132b is an end point of the segment 132a. The heading for the start point 134b differs from the heading for the start point 134a. In at least one example, the control unit 104 determines a distance for each segment 132 based on determined headings that achieve an effective and efficient route for the vectoring path 126.

The headings for the segments 132 can differ. In at least one example, headings for adjacent segments (that is, an end point of one segment is a start point for the next segment) differ. The distances for the segments 32 can be the same or different. As an example, the first segment 132a is adjacent to the second segment 132b. For example, the end point for the first segment 132a is the start point 134b for the second segment 132b. A first heading for the first segment 132a differs from a second heading for the second segment 132b.

In operation, after the vectoring path 126 has been provided, and the control unit 104 determines the headings for each start point 134 of the segments 132, an air traffic controller need not communicate with the aircraft to vector the aircraft according to the vectoring path 126. Instead, the control unit 104 monitors the real time position of the aircraft 102 along the vectoring path 126, and automatically outputs vectoring instruction signals to the aircraft 102 as the aircraft 102 reaches, or is about to reach (such as ten, twenty, or thirty seconds before reaching), the start points 134 for each segment 132. The vectoring instruction signals can be text or graphical data shown on a flight computer of the aircraft 102 regarding where and when to change a heading of the aircraft 102. For example, the vectoring instruction signal can be shown on the flight computer as a text message stating, "change heading to X upon reaching point Y." As another example, the vectoring instruction signal can be an audio signal broadcast from a speaker within the flight deck or cockpit of the aircraft 102. In at least one example, the air traffic controller can record voice commands associated with the various vectoring instruction signals corresponding to the various start points 134 of the segments 132. The control unit 104 saves such voice commands in a memory, and outputs such commands as the vectoring instruction signals at appropriate times, such as when the aircraft 102 reaches the start points 134 of the segments 132 in an airspace.

As described herein the control unit 104 receives the vectoring path 126 (as provided via the input device 114 of the user interface 106) and determines a series of vectoring instructions for the vectoring path 126. The vectoring instructions include headings for start points 134 of each segment 132 of the vectoring path 126. The control unit 104 outputs vectoring instruction signals including the vectoring instructions to the aircraft 102 as it flies along the vectoring path 126 in an airspace. The control unit 104 outputs the vectoring instructions to the pilot of the aircraft 102 at appropriate times (such as when the aircraft 102 reaches the start points 134 in the airspace). In at least one example, the control unit 104 also allows the air traffic controller an option to provide climb and descend instructions for the aircraft 102.

In at least one example, if a vectoring instruction does not provide a predetermined separation distance (for example, a minimum separation distance as determined by an aircraft operator, and/or an air traffic controller) between two or more aircraft 102 within the airspace, the control unit 104 can output an alert regarding the separation distance. For example, the control unit 104 can show the alert on the display 112 of the user interface 106, and/or a flight computer of an aircraft 102. In at least one example, the control unit 104 prevents such vectoring instruction and may prompt the air traffic controller to provide a revised vectoring path. In at least one other example, the control unit 104 may automatically revise the vectoring path 126 to ensure that the predetermined separation distance between different aircraft 102 is maintained.

The systems and methods described herein automatically provide pilots of aircraft 102 with clear control instructions, at appropriate times. In at least one example, an air traffic controller may override the instructions at any time either through a new vector line or voice instruction.

As described herein, the user interface 106 allows an air traffic controller to provide a haptic drawing (via the input device) on the display 112, which can also be shown on a display of a flight computer of the aircraft 102. The control unit 104 interprets the drawing as a series of control instructions, which are transmitted to the aircraft 102.

As described herein, the system 100 includes the control unit 104, which receives a vectoring path 126 for an aircraft 102. The vectoring path 126 diverts from an air traffic service route 124 for the aircraft 102. The control unit 104 automatically determines segments 132 of the vectoring path 126. The control unit 104 automatically monitors a position of the aircraft 102 within an airspace. The control unit 104 automatically sends vectoring instructions to the aircraft 102 in response to the aircraft 102 reaching locations within the airspace associated with one or more points (such as starting points) of the segments 132. The vectoring instructions include a heading for the aircraft 102 and a distance to fly at the particular heading.

The user interface 106 is in communication with the control unit 104. The user interface 106 includes the display 112 and the input device 114. In at least one example, the vectoring path 126 is provided by the input device 114 in relation to the display 112. For example, the vectoring path 126 can be electronically drawn on the display via the input device 114.

In at least one example, the control unit 104 sends a complete set of vectoring instructions via the vectoring instruction signal to the aircraft 102 as the aircraft approaches a start point for the vectoring path 126. The aircraft 102 can then be automatically operated according to the vectoring instructions provided by the control unit 104. In at least one example, the control unit 104 can automatically operate the aircraft 102 according to the vectoring instructions. For example, at each start point 134 of a segment 132, the aircraft 102 can be automatically operated to change heading according to the vectoring instructions. In this manner, the aircraft 102 can be automatically operated according to the vectoring instructions instead of relying on a pilot to manually operate the aircraft. In at least one example, an aircraft 102 can be an unmanned aerial vehicle (UAV) that can be automatically controlled and operated according to the vectoring instructions. Optionally, the aircraft 102 is not automatically controlled according to the vectoring instructions.

Figure 3:
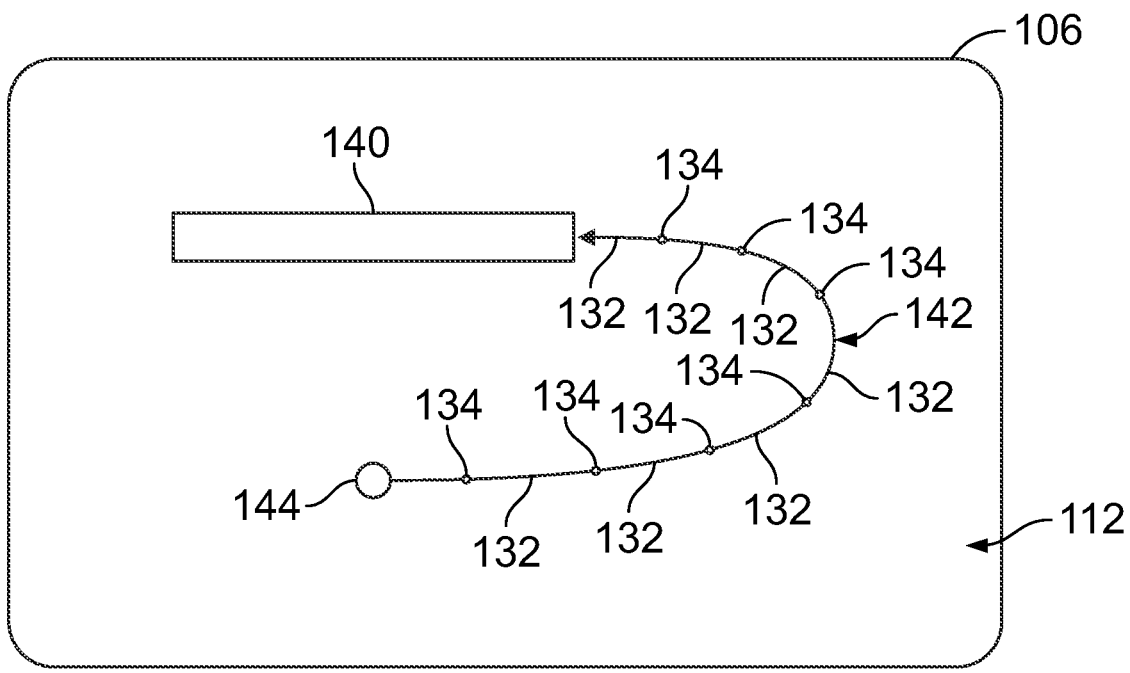
FIG. 3 illustrates a simplified front view of the display of the user interface, according to an example of the present disclosure.

FIG. 3 illustrates a simplified front view of the display 112 of the user interface 106, according to an example of the present disclosure. The display 112 can show a runway 140 of an airport. Referring to FIGS. 1-3, a vectoring path, such as an approach path 142, between a current position 144 of the aircraft 102 can be provided, as described herein (such as via the input device 114). The control unit 104 determines start points 134 for segments 132 of the approach path 142, as described above. The control unit 104 outputs vectoring instructions for the approach path 142 to the aircraft 102, as described above.

Figure 4:
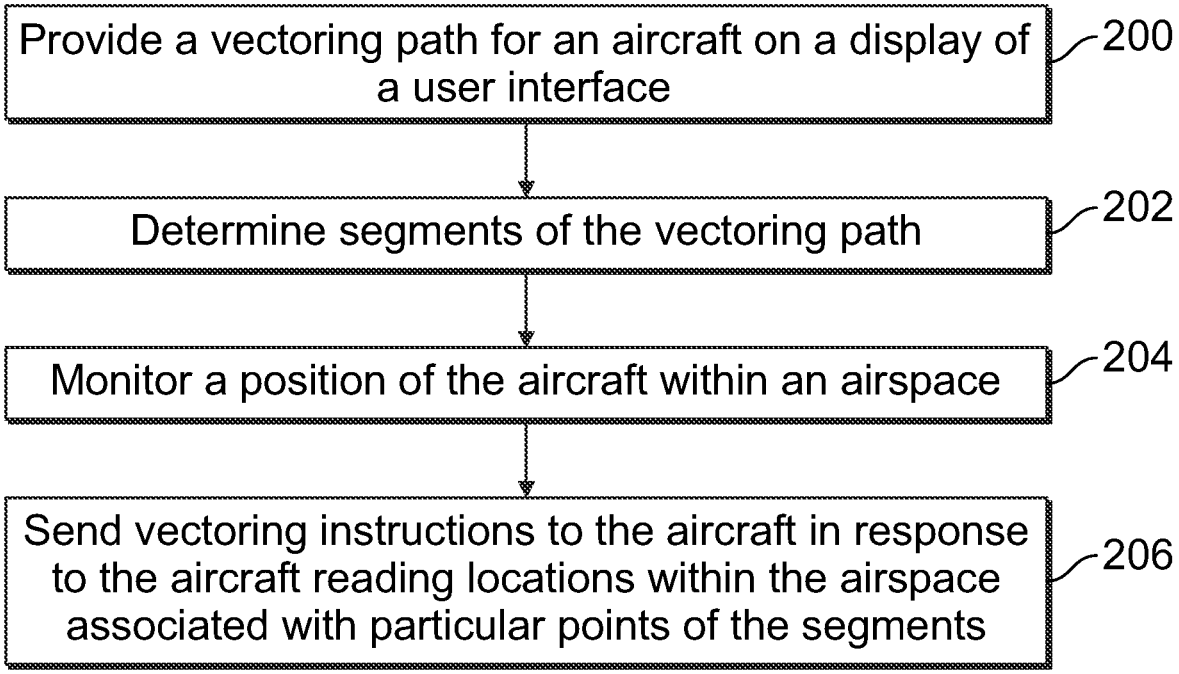
FIG. 4 illustrates a flow chart of a method for vectoring aircraft in relation to an air traffic service route, according to an example of the present disclosure.

FIG. 4 illustrates a flow chart of a method for vectoring aircraft in relation to an air traffic service route, according to an example of the present disclosure. Referring to FIGS. 1-4, at 200, a vectoring path 126 for an aircraft 102 is provided on the display 112 of the user interface 106. For example, an individual can electronically draw the vectoring path 126 on the display 112 through the input device 114, such as an electronic stylus, a touchscreen interface, or the like. Optionally, the individual can provide the vectoring path 126 through an input device 114, such as a mouse, a keyboard, or the like.

At 202, the control unit 104 automatically (without human intervention) determines segments 132 (including starting points 134) of the vectoring path 126. At 204, the control unit 104 automatically monitors (without human intervention) a position of the aircraft 102 within an airspace, such as by receiving data from the tracking subsystem 108. At 206, the control unit t104 automatically sends (without human intervention) vectoring instructions (via vectoring instruction signals) to the aircraft 102 in response to the aircraft reaching locations within the airspace associated with particular points (such as the starting points 134) of the segments 132.

Figure 5:
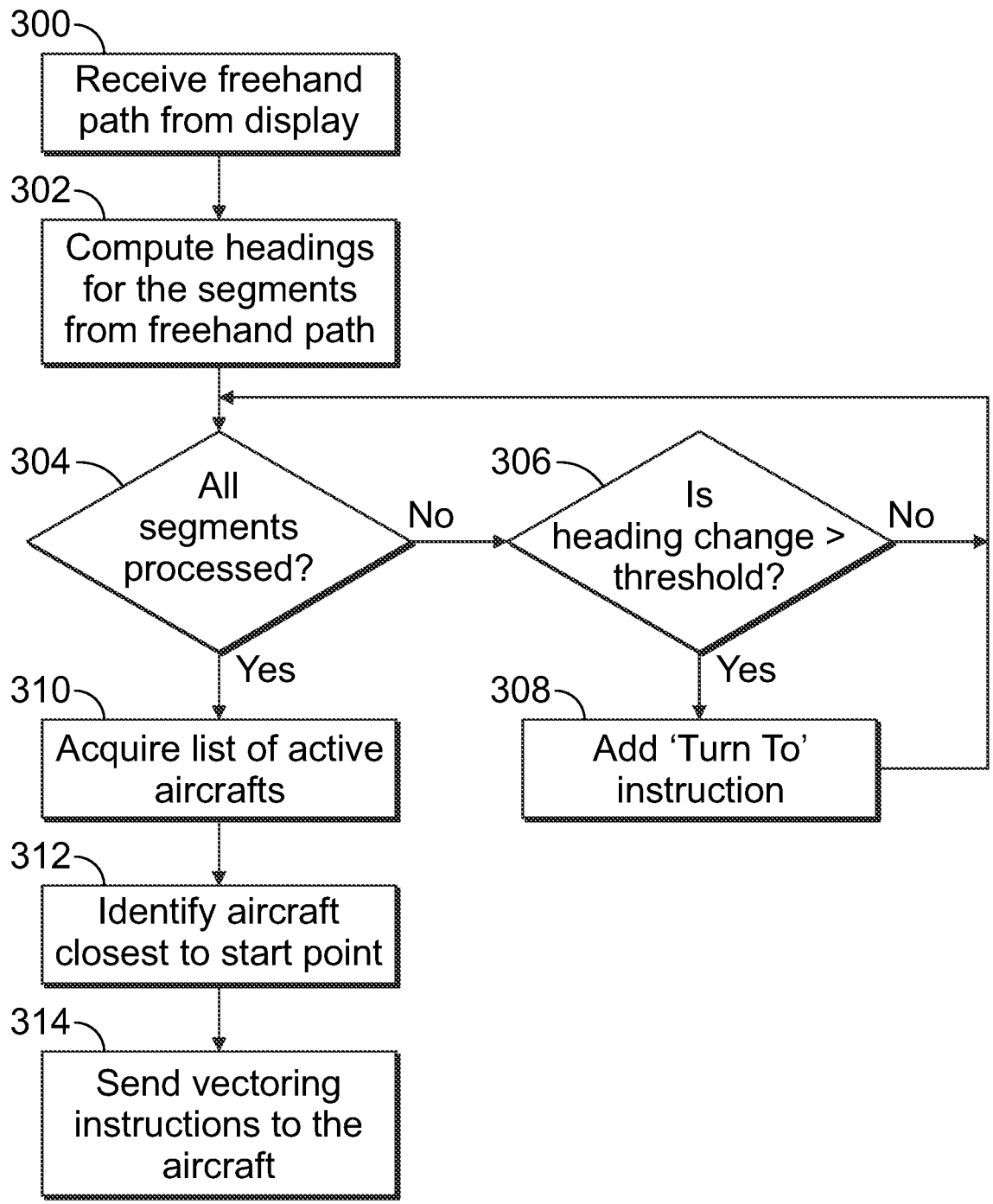
FIG. 5 illustrates a flow chart of a method for vectoring aircraft in relation to an air traffic service route, according to an example of the present disclosure.

FIG. 5 illustrates a flow chart of a method for vectoring aircraft in relation to an air traffic service route, according to an example of the present disclosure. Referring to FIGS. 1-3 and 5, at 300, the control unit 104 receives a freehand path of a vectoring path 126 from the display 112. For example, an air traffic controller uses the input device 114 to draw the freehand path. At 302, the control unit 104 computes headings for the segments 132 from the free hand path. At 304, the control unit 104 determines if all segments 132 (such as between a first point where the aircraft 102 is to divert from the air traffic service route, and a second point where the aircraft 102 links back to the air traffic service route) are processed. If not, at 306, the control unit 104 determines if a heading change is greater than a predetermined threshold.

The predetermined threshold may be a preset limit regarding a minimum change for a heading. If the heading change is less than the predetermined threshold, the method returns to 304. If, however, the heading change exceeds the predetermined threshold, the method proceeds to 308, at which the control unit 104 adds a "turn to" a particular heading in the vectoring instruction. The method then returns to 304.

If, at 304, all segments 132 are processed, the method proceeds from 304 to 310, at which the control unit 104 acquires a list of all active aircraft 102 within an airspace, such from a regulatory or monitoring agency. At 312, the control unit 104 then identifies an aircraft 102 closest to a start point of a vectoring path 126. At 314, the control unit 104 then sends vectoring instructions to the aircraft 102.

Figure 6:
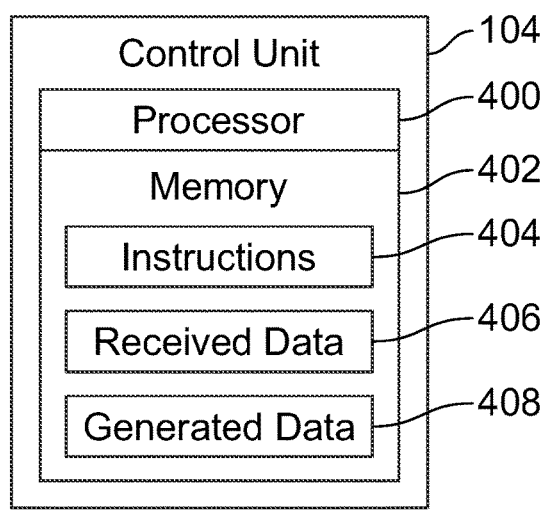
FIG. 6 illustrates a schematic block diagram of a control unit, according to an example of the present disclosure.

FIG. 6 illustrates a schematic block diagram of the control unit 104, according to an example of the present disclosure. In at least one example, the control unit 104 includes at least one processor 400 in communication with a memory 402. The memory 402 stores instructions 404, received data 406, and generated data 408. The control unit 104 shown in FIG. 6 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 104 may be or include one or more processors that are configured to control operation, as described herein.

The control unit 104 is configured to execute a set of instructions that are stored in one or more data storage units or elements (such as one or more memories), in order to process data. For example, the control unit 104 may include or be coupled to one or more memories. The data storage units may also store data or other information as desired or needed. The data storage units may be in the form of an information source or a physical memory element within a processing machine.

The set of instructions may include various commands that instruct the control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-6, examples of the subject disclosure provide systems and methods that allow large amounts of data to be quickly and efficiently analyzed by a computing device. For example, the control unit 104 can analyze various aspects of numerous aircraft 102 during a particular time period. As such, large amounts of data, which may not be readily discernable by human beings, are being tracked and analyzed. The vast amounts of data are efficiently organized and/or analyzed by the control unit 104, as described herein. The control unit 104 analyzes the data in a relatively short time in order to quickly and efficiently determine vectoring paths 126 for the various aircraft 102 and send vectoring instructions to the various aircraft 102 at appropriate times. As such, examples of the present disclosure provide increased and efficient functionality, and vastly superior performance in relation to a human being analyzing the vast amounts of data.

In at least one example, components of the system 100, such as the control unit 104, provide and/or enable a computer system to operate as a special computer system for determining vectoring paths 126 and automatically communicating (without human intervention) with pilots of aircraft 102 regarding the vectoring paths 126. The control unit 104 improves upon standard computing devices by determining the vectoring paths 126 and automatically communicating information regarding the vectoring paths 126 in an efficient and effective manner.

In at least one example, all or part of the systems and methods described herein may be or otherwise include an artificial intelligence (AI) or machine-learning system that can automatically perform the operations of the methods also described herein. For example, the control unit 104 can be an artificial intelligence or machine learning system. These types of systems may be trained from outside information and/or self-trained to repeatedly improve the accuracy with how data is analyzed to determine vectoring paths and communicate vectoring instructions in relation to numerous aircraft 102. Over time, these systems can improve by determining and communicating with increasing accuracy and speed, thereby significantly reducing the likelihood of any potential errors. For example, the AI or machine-learning systems can learn and determine various vectoring paths, segments, start points, and headings. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determinations and communications described herein. The training minimizes conflicts and interference by performing an iterative training algorithm, in which the systems are retrained with an updated set of data (for example, data received before, during, and/or after each flight of the aircraft 102) and based on the feedback examined prior to the most recent training of the systems. This provides a robust analysis model that can better determine runway alerts in a cost effective and efficient manner.

Figure 7:
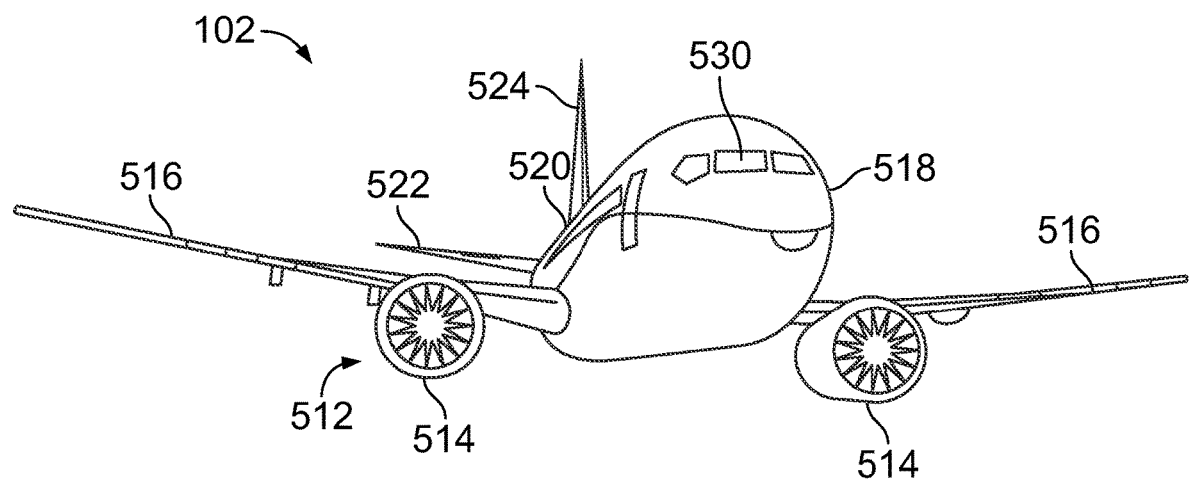
FIG. 7 illustrates a perspective front view of an aircraft, according to an example of the present disclosure.

FIG. 7 illustrates a perspective front view of an aircraft 102, according to an example of the present disclosure. The aircraft 102 includes a propulsion system 512 that includes engines 514, for example. Optionally, the propulsion system 512 may include more engines 514 than shown. The engines 514 are carried by wings 516 of the aircraft 102. In other examples, the engines 514 may be carried by a fuselage 518 and/or an empennage 520. The empennage 520 may also support horizontal stabilizers 522 and a vertical stabilizer 524. The fuselage 518 of the aircraft 102 defines an internal cabin 530, which includes a flight deck or cockpit, one or more work sections (for example, galleys, personnel carry-on baggage areas, and the like), one or more passenger sections (for example, first class, business class, and coach sections), one or more lavatories, and/or the like. FIG. 7 shows an example of an aircraft 102. It is to be understood that the aircraft 102 can be sized, shaped, and configured differently than shown in FIG. 7.

Further, the disclosure comprises examples according to the following clauses:

Clause 1. A system comprising:
a control unit configured to:
receive a vectoring path for an aircraft, wherein the vectoring path diverts from an air traffic service route for the aircraft,
automatically determine segments of the vectoring path,
automatically monitor a position of the aircraft within an airspace, and
automatically send vectoring instructions to the aircraft in response to the aircraft reaching locations within the airspace associated with one or more points of the segments.

Clause 2. The system of Clause 1, further comprising a user interface in communication with the control unit, wherein the user interface comprises a display and an input device, and wherein the vectoring path is provided by the input device in relation to the display.

Clause 3. The system of Clauses 1 or 2, wherein the segments include a first segment and a second segment that is adjacent to the first segment, wherein a first heading for the first segment differs from a second heading for the second segment.

Clause 4. The system of any of Clauses 1-4, wherein the control unit is further configured to output vectoring instruction signals including the vectoring instructions to the aircraft.

Clause 5. The system of Clause 4, wherein the vectoring instruction signals include text or graphical data configured to be shown on a display of a flight computer.

Clause 6. The system of Clauses 4 or 5, wherein the vectoring instruction signals include audio signals configured to be broadcast from a speaker within a flight deck or cockpit of the aircraft.

Clause 7. The system of any of Clauses 1-6, wherein the control unit is further configured to output an alert in response to one or more of the vectoring instructions not providing a predetermined separation distance between the aircraft and at least one other aircraft.

Clause 8. The system of any of Clauses 1-7, wherein the aircraft is configured to be automatically operated according to the vectoring instructions.

Clause 9. The system of any of Clauses 1-8, wherein at least a portion of the vectoring path includes an approach path to a runway.

Clause 10. The system of any of Clauses 1-9, wherein the control unit is an artificial intelligence or machine learning system.

Clause 11. A method comprising:

receiving, by a control unit, a vectoring path for an aircraft, wherein the vectoring path diverts from an air traffic service route for the aircraft;

automatically determining, by the control unit, segments of the vectoring path;

automatically monitoring, by the control unit, a position of the aircraft within an airspace; and automatically sending, by the control unit, vectoring instructions to the aircraft in response to the aircraft reaching locations within the airspace associated with one or more points of the segments.

Clause 12. The method of Clause 11, further comprising providing, by an input device of a user interface that is in communication with the control unit, the vectoring path in relation to a display.

Clause 13. The system of Clauses 11 or 12, wherein the segments include a first segment and a second segment that is adjacent to the first segment, wherein a first heading for the first segment differs from a second heading for the second segment.

Clause 14. The method of any of Clauses 11-13, wherein the automatically sending comprises outputting vectoring instruction signals including the vectoring instructions to the aircraft.

Clause 15. The method of Clause 14, wherein the vectoring instruction signals include one or more of text or graphical data configured to be shown on a display of a flight computer, or audio signals configured to be broadcast from a speaker within a flight deck or cockpit of the aircraft.

Clause 16. The method of any of Clauses 11-15, further comprising outputting, by the control unit, an alert in response to one or more of the vectoring instructions not providing a predetermined separation distance between the aircraft and at least one other aircraft.

Clause 17. The method of any of Clauses 11-16, further comprising automatically operating the aircraft according to the vectoring instructions.

Clause 18. The method of any of Clauses 11-17, wherein at least a portion of the vectoring path includes an approach path to a runway.

Clause 19. The method of any of Clauses 11-18, wherein the control unit is an artificial intelligence or machine learning system.

Clause 20. A non-transitory computer-readable storage medium comprising executable instructions that, in response to execution, cause one or more control units comprising a processor, to perform operations comprising:

receiving a vectoring path for an aircraft, wherein the vectoring path diverts from an air traffic service route for the aircraft;

automatically determining segments of the vectoring path;

automatically monitoring a position of the aircraft within an airspace; and automatically sending vectoring instructions to the aircraft in response to the aircraft reaching locations within the airspace associated with one or more points of the segments.

As described herein, examples of the present disclosure provide systems and methods for efficiently and effectively vectoring aircraft according to a re-routed flight path. Examples of the present disclosure provide systems and methods that reduce workload and stress for an air traffic controller.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a user interface including a display and an input device, wherein the input device is configured to be operated to electronically draw, as a freehand path, a vectoring path for an aircraft on the display, wherein the vectoring path diverts from an air service route for the aircraft; and
a control unit including one or more processors in communication with the user interface, wherein the control unit is configured to:
receive the vectoring path for the aircraft, as electronically drawn by the input device, from the user interface,
automatically determine segments of the vectoring path,
compute headings for the segments from the freehand path,
determine if all of the segments are processed,
in response to determining that not all of the segments are processed, determine if a heading change is greater than a predetermined threshold,
in response to determining that the heading change exceeds the predetermined threshold, add a turn to a particular heading in one or more vectoring instructions,
automatically monitor a real time position of the aircraft within an airspace,
in response to determining that all of the segments are processed, acquire a list of all aircraft within an airspace,
identify one of all of the aircraft closest to a start point of the vectoring path, and
send one or more of the vectoring instructions to the one of all of the aircraft closest to the start point of the vectoring path,
wherein the aircraft is configured to be automatically operated according to the vectoring instructions.

2. The system of claim 1, wherein the segments include a first segment and a second segment that is adjacent to the first segment, wherein a first heading for the first segment differs from a second heading for the second segment.

3. The system of claim 1, wherein the control unit is further configured to output vectoring instruction signals including the vectoring instructions to the aircraft.

4. The system of claim 3, wherein the vectoring instruction signals include text or graphical data configured to be shown on a display of a flight computer.

5. The system of claim 3, wherein the vectoring instruction signals include audio signals configured to be broadcast from a speaker within a flight deck or cockpit of the aircraft.

6. The system of claim 1, wherein the control unit is further configured to output an alert in response to one or more of the vectoring instructions not providing a predetermined separation distance between the aircraft and at least one other aircraft.

7. The system of claim 1, wherein at least a portion of the vectoring path includes an approach path to a runway.

8. The system of claim 1, wherein the control unit is an artificial intelligence or machine learning system.

9. The system of claim 1, wherein the control unit is further configured to automatically send the vectoring instructions to one or more of the aircraft in response to the one or more of aircraft reaching locations within the airspace associated with one or more points of the segments.

10. A method comprising:
operating an input device of a user interface to electronically drawn a vectoring path for an aircraft on a display of the user interface, wherein the vectoring path diverts from an air service route for the aircraft, wherein said operating the input device comprises electronically drawing the vectoring path as a freehand path;
receiving, by a control unit including one or more processors in communication with the user interface, the vectoring path for the aircraft, as electronically drawn by the input device, from the user interface;
automatically determining, by the control unit, segments of the vectoring path;
computing, by the control unit, headings for the segments from the freehand path;
determining, by the control unit, if all of the segments are processed;
in response to determining that not all of the segments are processed, determining, by the control unit, if a heading change is greater than a predetermined threshold;
in response to determining that the heading change exceeds the predetermined threshold, adding, by the control unit, a turn to a particular heading in one or more of the vectoring instructions;
automatically monitoring, by the control unit, a real time position of the aircraft within an airspace;
in response to determining that all of the segments are processed, acquiring, by the control unit, a list of all aircraft within the airspace;
identifying, by the control unit, one of all of the aircraft closest to a start point of the vectoring path;
sending, by the control unit, one or more of the vectoring instructions to the one of all of the aircraft closest to the start point of the vectoring path; and
automatically operating the aircraft according to the vectoring instructions.

11. The method of claim 10, wherein the segments include a first segment and a second segment that is adjacent to the first segment, wherein a first heading for the first segment differs from a second heading for the second segment.

12. The method of claim 10, wherein the automatically sending comprises outputting vectoring instruction signals including the vectoring instructions to the aircraft.

13. The method of claim 12, wherein the vectoring instruction signals include one or more of text or graphical data configured to be shown on a display of a flight computer, or audio signals configured to be broadcast from a speaker within a flight deck or cockpit of the aircraft.

14. The method of claim 10, further comprising outputting, by the control unit, an alert in response to one or more of the vectoring instructions not providing a predetermined separation distance between the aircraft and at least one other aircraft.

15. The method of claim 10, wherein at least a portion of the vectoring path includes an approach path to a runway.

16. The method of claim 10, wherein the control unit is an artificial intelligence or machine learning system.

17. The method of claim 10, further comprising automatically sending, by the control unit, the vectoring instructions to one or more of the aircraft in response to the one or more of aircraft reaching locations within the airspace associated with one or more points of the segments.

18. A non-transitory computer-readable storage medium comprising executable instructions that, in response to execution, cause one or more control units comprising a processor, to perform operations comprising:
receiving a vectoring path for an aircraft from a user interface, wherein the vectoring path diverts from an air traffic service route for the aircraft, wherein the vectoring path is electronically drawn as a freehand path by an input device on a display of the user interface;
automatically determining segments of the vectoring path;
computing headings for the segments from the freehand path;
determining if all of the segments are processed;
in response to determining that not all of the segments are processed, determining, by the control unit, if a heading change is greater than a predetermined threshold;
in response to determining that the heading change exceeds the predetermined threshold, adding a turn to a particular heading in one or more of the vectoring instructions;
automatically monitoring a real time position of the aircraft within an airspace;
in response to determining that all of the segments are processed, acquiring a list of all aircraft within the airspace;
identifying one of all of the aircraft closest to a start point of the vectoring path;
sending, by the control unit, one or more of the vectoring instructions to the one of all of the aircraft closest to the start point of the vectoring path; and
automatically operating the aircraft according to the vectoring instructions.

19. The non-transitory computer-readable storage medium of claim 18, the operations further comprising automatically sending the vectoring instructions to one or more of the aircraft in response to the one or more of aircraft reaching locations within the airspace associated with one or more points of the segments.

20. The non-transitory computer-readable storage medium of claim 18, wherein at least a portion of the vectoring path includes an approach path to a runway.

* * * * *